United States Patent Office 3,080,226
Patented Mar. 5, 1963

3,080,226
HERBICIDAL COMPOSITIONS
Karl Milles, Munich, Germany, assignor to Wacker-Chemie G.m.b.H., Munich, Germany, a corporation of Germany
No Drawing. Filed Dec. 23, 1958, Ser. No. 782,360
Claims priority, application Germany Dec. 30, 1957
6 Claims. (Cl. 71—2.4)

This invention relates to selective herbicidal compositions or weed eradicators and it has for its object to provide a novel and improved fluorine-containing compound of this type.

Another object of the invention is provide a herbicidal composition composed of a plurality of ingredients, including a fluorine-containing compound, which complement each other in such a way as to provide a marked increase in the synergetic efficiency of the whole.

Another object is to provide a compound of the type specified having improved selective weed combatting properties.

Various other objects and advantages will be apparent as the nature of the invention is more fully disclosed.

Fluorides have already been proposed for the general purpose of controlling weeds on highways, localities, railroad tracks, etc., but they have failed of their purpose because of their inferior efficacy. Mixtures of sodium chlorate and sodium fluoride have also been used for combating undesirable plant growth. Furthermore, the herbicidal effect of certain halogenated and nitrated phenols and cresols, as well as of halogenated aryloxyaliphatic acids is known, for example sodium pentachlorophenate, dinitroalkylphenol or 2,4-dichlorophenoxyacetic acid. There have also been used biocidal concentrates of pentachlorophenol in admixture with phosphoric acid esters or lower aliphatic alcohols, ketones, mesityloxide, polyoxyethylene sorbitol fatty acid esters and aromatic hydrocarbons. In another case mixtures of aryloxyaliphatic acids with ammonium fluoboride have been used for combating weed grasses.

I have now discovered that a considerable increase in the synergetic efficiency of the herbicidal type occurs, when applicable solid or liquid form weed combating means are used, which contain phenols and organic or inorganic fluorine compounds.

As fluorine compounds there are usable, for example, hydrofluoric acid, fluosilicic acid, fluoboric acid and its salts, aromatic and aliphatic fluorine compounds, substitued fluorine-nitrogen-hydrogen compounds, etc.

In the case of phenol and cresol compounds those mainly useful are in halogenated and nitrated form; of course, it is also possible to use mixtures of said substances or even compounds of said substances.

I have found it advantageous, furthermore, to use weed combating means, which besides phenols and organic or inorganic fluorine compounds also contain aryloxyaliphatic acids.

A surprising synergetic efficiency increase is obtained with weed combating media of this type which goes far beyond the mere additive effects of the individual components and involves, rather, a cumulative or multiplied action of the added fluorine compounds on the other ingredients.

The preparations so produced may be used with good result in the field of cereals for selective weed combating, in which even small quantities are sufficient for killing off dicotyledonous weeds.

A further improvement of the selective properties may be obtained by the addition of calcium compounds to the intimate mixture, whereby an unnecessary removal of lime from the grain-bearing plants is prevented. Colloidal silicic acid or organic silicon compounds also prevent danger of burning. Other herbicides, fungicides, insecticides, such as plant nutritive substances, wetting agents and adhesives may also be added to the intimate mixtures hereinafter described.

The use of the weed eradicators is not limited to the fluid form. It is also possible to use certain types of dusting or spraying media. In this case it is immaterial whether the auxiliary substances are inert fillers, plant nutritive substances or even plant preservatives.

The following are examples of preferred weed eradicator compounds embodying the present invention, all parts being by weight:

Example 1

| | Parts |
|---|---|
| Sodium pentachlorophenate | 60 |
| Sodium fluoride | 20 |
| Sodium carbonate | 20 |
| | 100 |

Example 2

| | |
|---|---|
| Sodium pentachlorophenate | 50 |
| Sodium fluoride | 20 |
| Ammonium fluoborate | 10 |
| Sodium tetrahexaphosphate | 20 |
| | 100 |

Example 3

| | |
|---|---|
| Sodium dinitroorthocresylate | 20 |
| Sodium pentachlorophenate | 30 |
| Sodium bifluoride | 30 |
| Sodium carbonate | 20 |
| | 100 |

Example 4

| | |
|---|---|
| Sodium pentachlorophenate | 60 |
| Sodium fluoacetic acid | 20 |
| Potassium carbonate | 10 |
| Urea | 10 |
| | 100 |

Example 5

| | |
|---|---|
| Sodium dinitroorthocresylate | 40 |
| Sodium fluoride | 30 |
| Sodium carbonate | 20 |
| Cellulose pitch | 10 |
| | 100 |

Example 6

| | |
|---|---|
| Sodium pentachlorophenate | 50 |
| Sodium fluoride | 10 |
| 2-4 D-sodium salt | 10 |
| Sodium carbonate | 20 |
| Borax | 10 |
| | 100 |

Example 7

| | |
|---|---|
| Sodium pentachlorophenate | 50 |
| Sodium fluoride | 20 |
| 2, 4 D-sodium salt | 10 |
| Sodium carbonate | 20 |
| | 100 |

In using the compounds described in Examples 1–7 there will be needed 6–8 kilos per hectare, dissolved in 600–800 l. of water.

The marked increase in the effectiveness of my weed eradicating media which emphasizes the novelty of the invention, as compared with the known individual components, may be seen from the following comparison.

For instance, if there is used a weed eradicator which contains 6 kilos per hectare sodium fluoride in 800 l.

of water, there is no effect in case of field hemp nettle. However, in the case of my weed eradicating media there occurs, with the use of the same quantitative proportions, a complete destruction. The same results are found when comparing my compounds with sodium pentachlorophenate, 2,4 D-sodium salt, sodium dinitroorthocresylate.

The invention claimed is:

1. A herbicidal composition consisting of a mixture in substantially the following parts by weight: sodium dinitroorthocresylate 20 parts, sodium pentachlorophenate 30 parts, sodium bifluoride 30 parts, sodium carbonate 20 parts.

2. A herbicidal composition consisting of a mixture, in substantially the following parts by weight, of sodium pentachlorophenate 60 parts, sodium fluoacetic acid 20 parts, potassium carbonate 10 parts, urea 10 parts.

3. A herbicidal composition consisting of a mixture, in substantially the following parts by weight, of sodium dinitroorthocresylate 40 parts, sodium fluoride 30 parts, sodium carbonate 20 parts, cellulose pitch 10 parts.

4. A herbicidal composition consisting of a mixture, in substantially the following parts by weight, of sodium pentachlorophenate 50 parts, sodium fluoride 10 parts, the sodium salt of 2,4-dichlorphenoxyacetic acid 10 parts, sodium carbonate 20 parts, borax 10 parts.

5. A herbicidal composition comprising 10–30% of an alkali metal fluoracetic acid and a substance selected from the following group in the following proportions: 30–60% sodium pentachlorophenate, 20–40% sodium dinitroorthocresylate.

6. A herbicidal composition according to claim 5 which also contains 10% sodium salt of 2,4-dichlorphenoxyacetic acid.

References Cited in the file of this patent
UNITED STATES PATENTS

| | | |
|---|---|---|
| 1,125,457 | Buckley | Jan. 19, 1915 |
| 2,022,673 | Kniskern et al. | Dec. 3, 1935 |
| 2,368,274 | Torley | Jan. 30, 1945 |
| 2,370,349 | Hance | Feb. 27, 1945 |
| 2,435,676 | Fitzgerald | Feb. 10, 1948 |
| 2,502,809 | Vogelsang | Apr. 4, 1950 |
| 2,626,212 | Sowa | Jan. 20, 1953 |
| 2,709,648 | Ryker et al. | May 31, 1955 |
| 2,711,367 | Parrish | June 21, 1955 |
| 2,768,889 | Twomey | Oct. 30, 1956 |
| 2,769,702 | Sowa | Nov. 6, 1956 |
| 2,821,467 | Lewis | Jan. 28, 1958 |
| 2,833,639 | Barrons et al. | May 6, 1958 |
| 2,924,516 | D'Ogny | Feb. 9, 1960 |

FOREIGN PATENTS

| | | |
|---|---|---|
| 501,687 | Canada | Apr. 20, 1954 |
| 727,399 | Great Britain | Mar. 30, 1955 |

OTHER REFERENCES

Marcovitch: "Journal of American Society of Agronomy," vol. 33, No. 4, page 367, April 1941.

David et al.: Chemical Abstracts, vol. 47, Jan.-Mar. 1953, 260e.